(12) United States Patent
Fages

(10) Patent No.: US 10,907,485 B2
(45) Date of Patent: Feb. 2, 2021

(54) PROPELLER BLADES

(71) Applicant: Ratier-Figeac SAS, Figeac (FR)

(72) Inventor: Christian Fages, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 32 days.

(21) Appl. No.: 16/036,070

(22) Filed: Jul. 16, 2018

(65) Prior Publication Data

US 2019/0017395 A1 Jan. 17, 2019

(30) Foreign Application Priority Data

Jul. 17, 2017 (EP) .................................... 17305948

(51) Int. Cl.
| | |
|---|---|
| *B64C 11/06* | (2006.01) |
| *F01D 5/30* | (2006.01) |
| *B64C 11/04* | (2006.01) |
| *C21D 1/10* | (2006.01) |
| *C21D 9/40* | (2006.01) |
| *F16C 19/06* | (2006.01) |

(52) U.S. Cl.
CPC ............ *F01D 5/3061* (2013.01); *B64C 11/04* (2013.01); *B64C 11/06* (2013.01); *C21D 1/10* (2013.01); *C21D 9/40* (2013.01); *F16C 19/06* (2013.01)

(58) Field of Classification Search
CPC ....... F01D 5/3061; B64C 11/04; B64C 11/06; C21D 1/10; C21D 9/40; F16C 19/06
See application file for complete search history.

(56) References Cited

U.S. PATENT DOCUMENTS

| | | | | |
|---|---|---|---|---|
| 4,921,403 | A * | 5/1990 | Poucher | B64C 11/06 416/147 |
| 5,222,297 | A | 6/1993 | Graff et al. | |
| 8,292,509 | B2 * | 10/2012 | Montagu | F01D 25/16 384/453 |
| 2015/0110633 | A1 * | 4/2015 | Nagle | F01D 5/147 416/218 |

FOREIGN PATENT DOCUMENTS

| | | |
|---|---|---|
| EP | 2862800 A1 | 4/2015 |
| JP | 2012163204 A | 8/2012 |

OTHER PUBLICATIONS

Extended European Search Report for International Application No. 17305948.6 dated Oct. 27, 2017, 7 pages.

* cited by examiner

*Primary Examiner* — J. Todd Newton
*Assistant Examiner* — Sabbir Hasan
(74) *Attorney, Agent, or Firm* — Cantor Colburn LLP

(57) ABSTRACT

A propeller blade retention element comprises a body portion formed of a corrosion resistant metal, and at least one bearing race portion attached to the body portion, the race portion being formed of an induction hardenable, corrosion resistant metal.

9 Claims, 5 Drawing Sheets

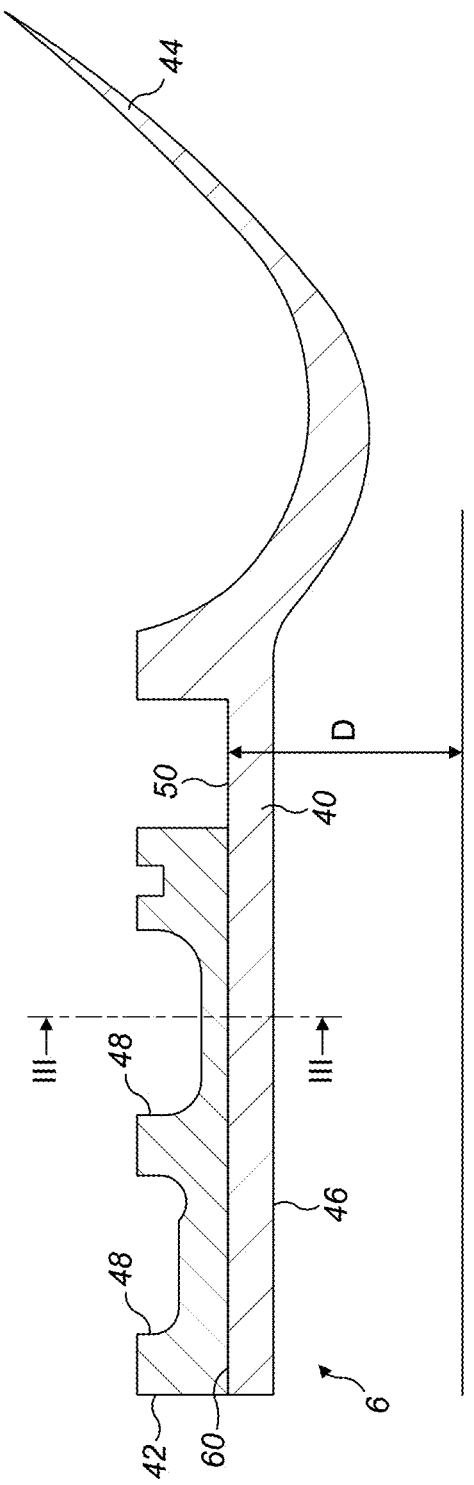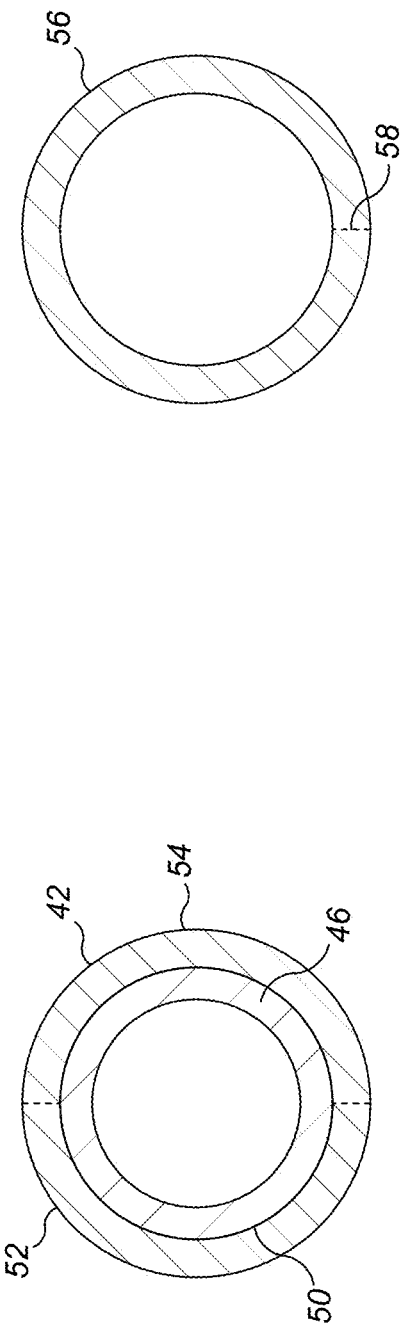

PROPELLER BLADES

FOREIGN PRIORITY

This application claims priority to European Patent Application No. 17305948.6 filed Jul. 17, 2017, the entire contents of which is incorporated herein by reference.

TECHNICAL FIELD

The present disclosure relates to propeller blades, and in particular to retention elements for propeller blades.

BACKGROUND

Propeller blades typically comprise a structural spar which is attached at one end to a retention element. The retention element retains the blade in a hub of the propeller and is generally made from a metal. It typically comprises one or more bearing races which will allow the pitch of the blade to be varied during operation. Examples of such propeller blades are disclosed in U.S. Pat. No. 5,222,297 A and US 2105/0110633 A1.

The retention element is typically formed from a corrosion resistant metal such as stainless steel. However, the bearing races of the metal retention member must be hardened so as to resist wear during use. As such, it is common to carburize the bearing races in order to increase their hardness. This may, however, lead to the bearing races losing some of their corrosion resistance.

SUMMARY

From a first aspect, the disclosure provides a propeller blade retention element comprising a body portion formed of a first corrosion resistant metal, and at least one bearing race portion attached to the body portion. The race portion is formed of a second, different corrosion resistant metal which retains its corrosion resistance after hardening.

In embodiments, the bearing race portion is friction welded to the body portion.

In various embodiments, the bearing race portion is attached to an external circumferential surface of the body portion.

In various embodiments, the bearing race portion is formed from two semi-circular parts or an annular element having an axially extending slot formed therein.

In other embodiments, the bearing race portion comprises an annular element attached to a distal end surface of the body portion.

In various embodiments, the propeller retention element may comprise a first bearing race portion provided at a first axial location of the body portion and a second bearing race portion provided at a second axial location of the body portion.

The disclosure also provides a method of manufacturing a propeller retention element. The method comprises providing a body portion of a first corrosion resistant metal and friction welding at least one bearing race portion of a second, different corrosion resistant, hardenable metal, to the body portion. The second corrosion resistant metal retains its corrosion resistance after hardening. The method further comprises hardening the at least one bearing race portion either before or after it has been welded to the base portion.

In various embodiments, the hardening may comprise induction hardening, through-hardening, case hardening, carburising or nitriding Various embodiments comprise friction welding the at least one bearing race portion to an external circumferential surface of the body portion.

The external circumferential surface of the body portion may be cylindrical, and the at least one bearing race portion may be linearly friction welded to the external circumferential surface. The at least one bearing race portion may comprise an annular element having an axially extending slot formed therethrough, or may comprise a pair of axially extending elements.

In certain embodiments, the external circumferential surface of the body portion may be is tapered and the at least one bearing race portion be rotationally friction welded to the external circumferential surface.

In certain embodiments, the external circumferential surface of the body portion may comprise first and second axially spaced surfaces for receiving first and second bearing race portions.

In certain embodiments the maximum outer diameter of the first surface may be less than the minimum outer diameter of the second surface.

In certain embodiments, the at least one bearing race portion is rotation friction welded to a distal end face of the body portion.

In certain embodiments, the at least one bearing race portion may comprise an annular element.

In certain embodiments, the body portion may be made from a first corrosion resistant stainless steel, for example X12CrNiMoV12 stainless steel, and the at least one bearing race portion be made from hardenable, for example induction hardenable corrosion resistant stainless steel, for example. X40CrMoV16-2 stainless steel.

The disclosure also extends to a propeller blade comprising a propeller blade retention element in accordance with the disclosure and an airfoil section attached to the propeller blade retention element.

BRIEF DESCRIPTION OF DRAWINGS

An embodiment of the disclosure will now be described by way of example only with reference to the accompanying drawings in which:

FIG. 2 shows a first embodiment of retention element in accordance with the disclosure;

FIG. 3 shows a cross-sectional view along the line IV-IV of FIG. 2;

FIG. 4 shows a cross-sectional view along the line IV-IV of FIG. 2 for an alternative embodiment;

DETAILED DESCRIPTION

Figure 1:
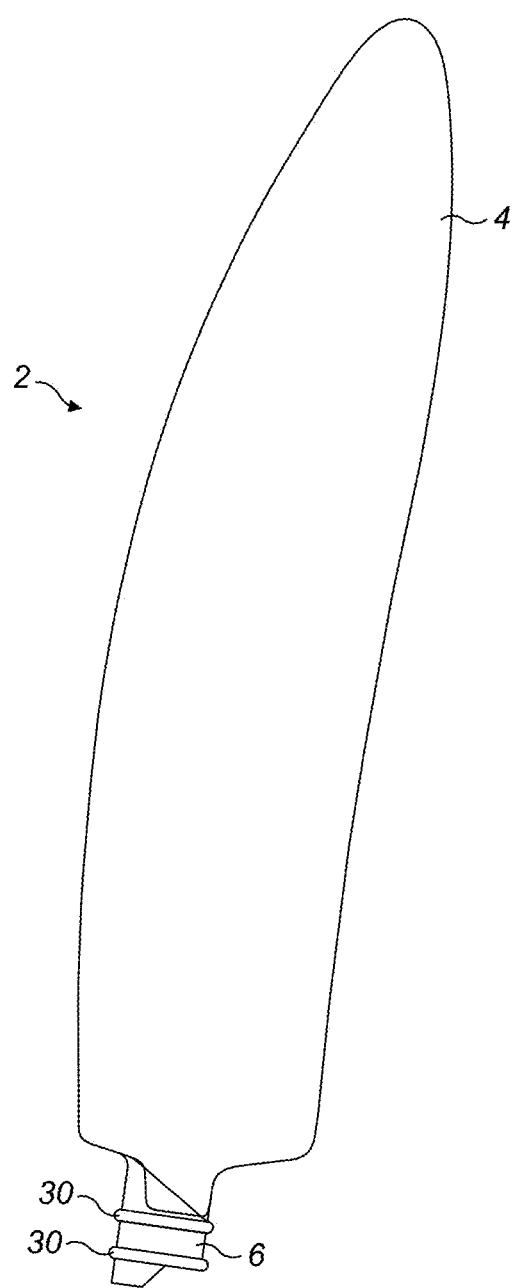
FIG. 1 shows a propeller blade.

With reference to FIG. 1, a propeller blade 2 comprises an airfoil portion 4 and a retention element 6, the retention element attaching the propeller blade 2 to a propeller hub (not shown).

The retention element 6 may comprise one or more bearing races 30. The bearing races 30 cooperate with bearing races on the propeller hub to receive roller elements, for example ball bearings, which will allow the retention element 6 to rotate relative to the hub as is required when the pitch of the propeller blade 2 is changed in use.

The present disclosure is concerned with the provision of such bearing races 30 on a retention element 6.

A first embodiment of retention element 6 in accordance with this disclosure is illustrated in FIG. 2. The retention element 6 comprises a body portion 40 and a bearing race portion 42. The base portion 6 comprises a distal end 44 for attachment to a propeller blade spar, and a proximal end 46 which supports the bearing race portion 42.

In this embodiment, the bearing race portion 42 comprises two bearing races 48, although in accordance with the disclosure, the bearing race portion 42 may contain more or fewer bearing races 48. The bearing race portion 42 is mounted on an external circumferential surface 50 of the proximal portion 46 of the body portion 40. In this embodiment, the external circumferential surface 50 is generally cylindrical, having a generally constant outer diameter D.

The body portion 40 is made from a corrosion resistant material. Examples of such materials may be stainless steels, for example, X12CrNiMoV12 stainless steel. The bearing race portion 42, however, is formed from a different material. In particular, the bearing race portion 42 is made from a corrosion resistant, hardenable material which will retain effective corrosion resistance after hardening. Examples of such materials may be stainless steels, for example X40CrMoV16-2 or X30CrMoN15-1 stainless steels. The advantages of this construction will be described further below.

The bearing race portion 42 is friction welded to the external circumferential surface 50 of the body portion 40. In this embodiment, the bearing race portion 42 may be formed from two or more parts 52, 54, for example semi-circular parts as illustrated schematically in FIG. 3 (the dotted line indicating a joint or gap between the two parts 52, 54). In an alternative embodiment, illustrated in FIG. 4, the bearing race portion may be formed from a single annular element 56 having an axially extending slot 58 formed therein (the dotted line indicating a joint or gap between the opposed surfaces of the slot 58).

In these embodiments, the bearing race portion 42 may be linearly friction welded to the external circumferential surface 50 of the body portion 40. This is facilitated by the multi-part construction of the bearing race portion 42 or the slotted annular construction thereof, which will allow pressure to be applied between the bearing race portion 42 and the circumferential surface 50 during welding. The bearing race portion 40 is thereby joined to the external circumferential surface 50 of the body portion 40 along a friction welded joint 60. When using a bearing race portion 42 having a slot 58 or two or more parts 52, 54, the friction welding process permits a circumferentially continuous bearing race 30 to be produced, as illustrated. However, depending on the particular application, a circumferentially discontinuous bearing race 30 may be permissible. Friction welding techniques are well known in the art, and need not, therefore, be described further here.

The bearing race portion 42 is, as discussed above, made from a corrosion resistant, induction hardenable material. Once the bearing race portion 42 has been friction welded to the body portion 40, the bearing race portion 42 is induction hardened. In embodiments, the bearing race portion 42 is only surface hardened. However, in other embodiments the bearing race portion may be through hardened.

In alternative embodiments, the bearing race portion 42 may be induction hardened, either surface hardened or through hardened, prior to being friction welded to the body portion 40.

This provides the bearing races 48 with sufficient hardness for their intended use. However, the material used is such that even after hardening (for example either surface hardening, for example induction hardening, or through hardening), the bearing race portion 42 retains its corrosion resistance. In this manner, both the body portion 40 and the bearing race portion 42 remain corrosion resistant. This is advantageous and avoids potential problems which may have arisen should the retention element 6 have been made from a corrosion resistant material which had to be carburized to harden its bearing races, which could lead to the bearing races losing some of their corrosion resistance.

After hardening, the bearing races 48 may be finished, for example ground or hard turned.

Figure 5:
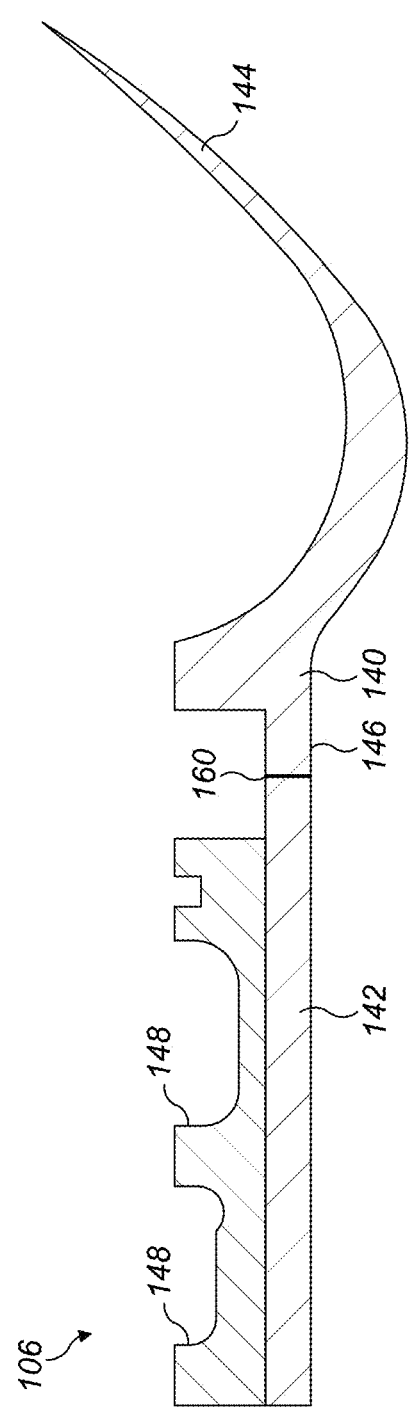
FIG. 5 shows a cross-sectional view of a second embodiment of retention element in accordance with the disclosure.

Turning now to FIG. 5, a second embodiment of retention element 106 in accordance with the disclosure is illustrated. This is similar in concept to the first embodiment, and only the significant differences will be discussed in detail.

The retention element 106 comprises a body portion 140 and a bearing race portion 142. The base portion 6 comprises a distal end 144 for attachment to a propeller blade spar 8 as illustrated schematically in FIG. 2 and a proximal end 146 which supports the bearing race portion 142.

As in the earlier embodiment, the bearing race portion 142 comprises two bearing races 148, although in accordance with the disclosure, the bearing race portion 142 may contain more or fewer bearing races 148. Unlike the earlier embodiment, however, in this embodiment, bearing race portion 142 is mounted to a distal end surface 150 of the proximal end 146 of the body portion 140. Both the distal end surface 150 and bearing race portion 142 are annular in shape.

The body portion 140 and bearing race portion 142 are made from the same materials as in the earlier embodiment.

In this embodiment, the bearing race portion 142 is rotationally, rather than linearly, friction welded to the distal end surface 150 of the body portion 140 and is thereby joined to the distal end surface 150 of the body portion 140 by a friction welded butt joint 160. Rotational friction welding techniques are also well known in the art, and need not, therefore, be described further here. As in the earlier embodiment, the bearing race portion 142 may be induction hardened before or after it has been friction welded to the body portion 140, and finish machined as necessary.

Figure 6:
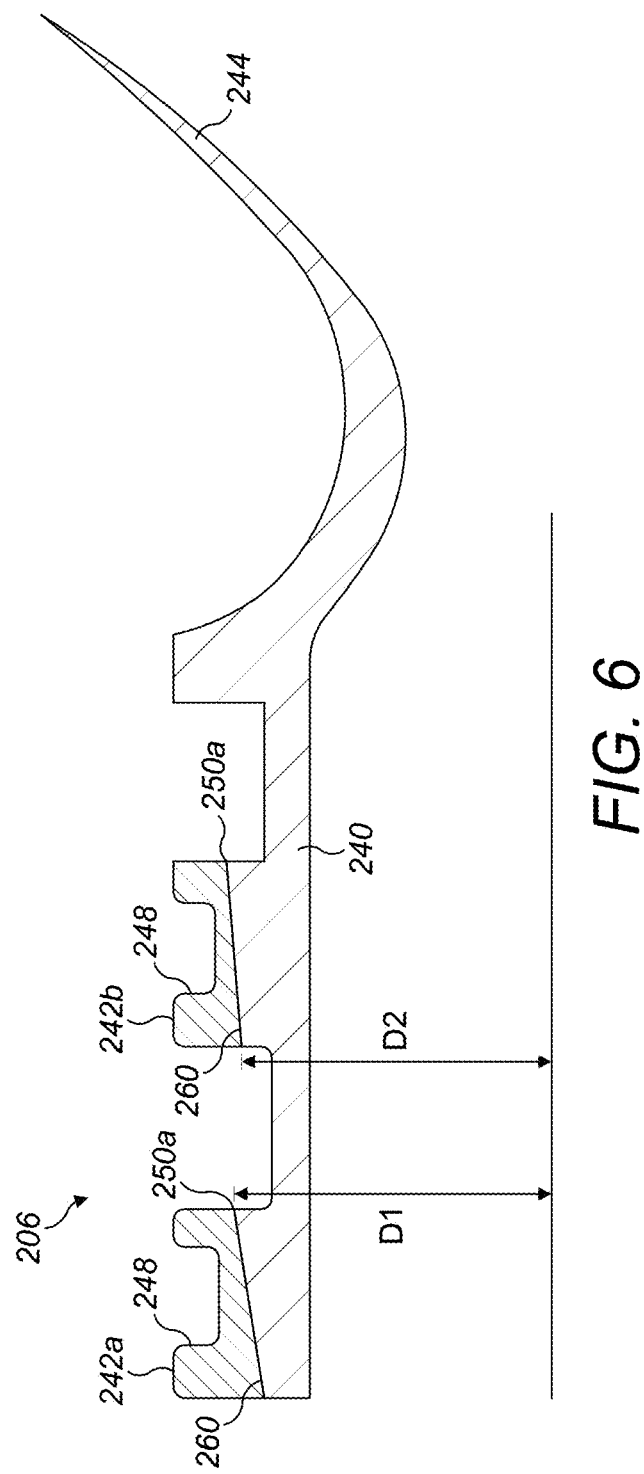
FIG. 6 shows a third embodiment of retention element in accordance with the disclosure.

Turning now to FIG. 6, a third embodiment of retention element 206 in accordance with the disclosure is illustrated.

The retention element 206 comprises a body portion 240 and first and second bearing race portions 242a, 242b. The base portion 240 comprises a distal end 244 for attachment to a propeller blade spar 8 as illustrated schematically in FIG. 2 and a proximal end 246 which supports the first and second bearing race portions 242a, 242b.

Each bearing race portion 242a, 242b comprises a single bearing race 248, although in accordance with the disclosure, the bearing race portions 242 may each contain more or fewer bearing races 248.

The body portion 240 and the bearing race portion 242a, 242b, are made from the same materials as in the earlier embodiments.

The first and second bearing race portions 242a, 242b are friction welded to respective first and second circumferential surfaces 250a, 250b of the body portion 240. The first and second circumferential surfaces 250a, 250b are spaced axially from one another.

In this embodiment, the first and second circumferential surfaces 250a, 250b are formed as tapering surfaces, the diameter of each surface increasing in a direction towards the distal end 244 of the body portion 240. The first and second bearing race portions 242a, 242b are formed as annular elements having a tapering internal diameter which generally matches that of the first and second circumferential surfaces 250a, 250b. The maximum diameter D1 of the first circumferential surface 250a (that furthest removed from the distal end 244 of the body portion 240) is less than the minimum diameter D2 of the second circumferential surface 250b such that the second bearing race portion 242 may be slipped over the first circumferential surface 250a for location with the second circumferential surface 250b. In this embodiment, therefore, the second bearing race portion 242b would be positioned and welded before the first bearing race portion 242a.

In view of the tapering interfaces 260 the first and second bearing race portions 242a, 242b may be rotationally frictionally welded to the first and second circumferential surface.

As in the earlier embodiments, the bearing race portion 242a, 242b are hardened either before or after they have been friction welded to the body portion 240 and finish machined as necessary. The particular hardening process used may be chosen depending on the materials used, but may include induction hardening (which may be useful for post-welding heat treatment) or through-hardening (which may be useful for pre-welding heat treatment). Of course other hardening processes may be used if appropriate.

Figure 7:
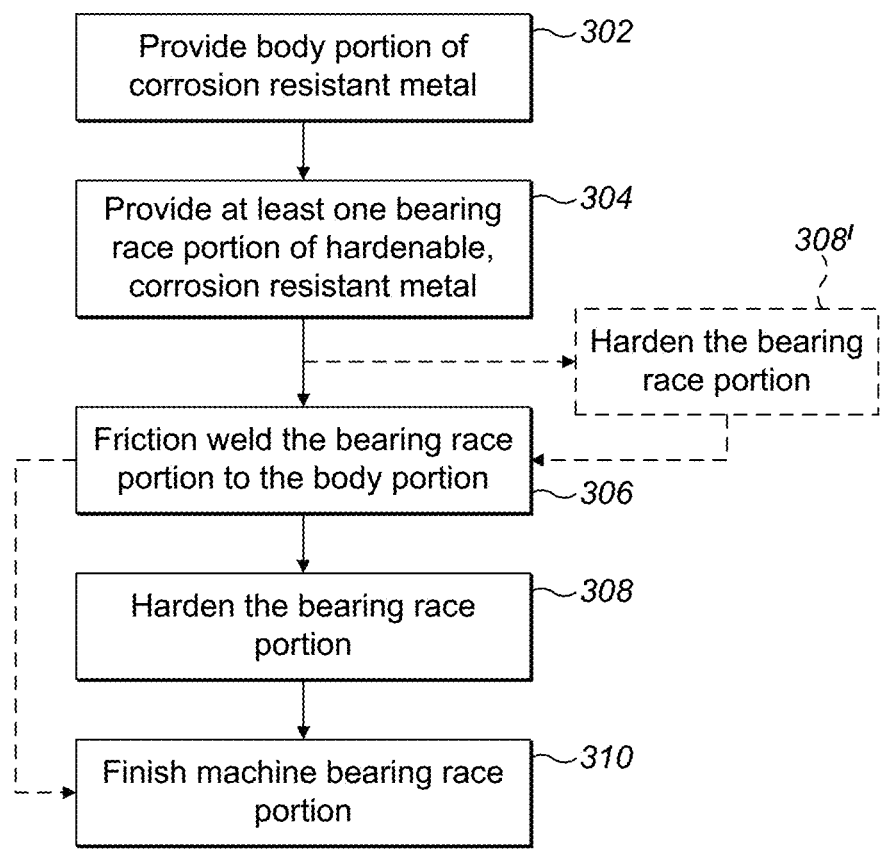
FIG. 7 illustrates schematically, a method in accordance with the disclosure.

Thus it will be seen that in all the above embodiments, the retention element is formed by a process which can be summarised as follows with reference to FIG. 7.

In a first step 302, a body portion of a corrosion resistant metal, for example a suitable stainless steel, is provided. In a second step 304, at least one bearing race portion of an induction hardenable, corrosion resistant metal such as a suitable stainless steel is provided. In a third step 306, the bearing race portion is friction welded to the body portion. In a fourth step 308, the bearing race portion is induction hardened. In a fifth step 310, the bearing race portion may be subjected to a finishing process, for example grinding.

Of course, the various embodiments described above are merely examples and modifications may be made thereto without departing from the scope of the disclosure.

For example, in a modification of the embodiment of FIG. 6, just a single bearing race portion 242a with more or fewer bearing races 248 may be provided with the bearing race portion 242a being rotationally friction welded to a tapering circumferential surface 250a of the body portion 240. Also, in a further modification of that embodiment, one or both of the external circumferential services 250a, 250b may be cylindrical and the corresponding bearing race portion 242a, 242b have a structure such as that described in the embodiment of FIGS. 2 to 4 and be attached to the external circumferential services 250a, 250b by linear friction welding.

Also, in a modification of the method disclosed, the hardening step 308' may be performed prior to the friction welding step 306. This alternative is illustrated in dotted lines in FIG. 7.

It will be seen that in accordance with embodiments of this disclosure, by choosing the appropriate materials for the body portion of the retention element and the bearing race portion of the retention element, a corrosion resistant retention element may be provided which has the necessary hardness for the bearing races but also the necessary corrosion resistance over the entire retention element after hardening. The particular material and hardening process used will depend on the particular application, but the skilled person will recognise materials and processes which fulfil these requirements. The particular examples given above are not limited, and the skilled person will be able to determine other suitable materials from their general knowledge. Thus in other embodiments, hardening processes such as nitriding and carburizing may be used provided the bearing race portion retains corrosion resistant properties after hardening.

The invention claimed is:

1. A propeller blade retention element comprising;
   a body portion formed of a first corrosion resistant stainless steel, and
   at least one bearing race portion attached to the body portion, the at least one bearing race portion being formed of a second, different hardened corrosion resistant stainless steel that is an induction hardenable corrosion resistant stainless steel that has retained its corrosion resistance after hardening.

2. A propeller blade retention element as claimed in claim 1, wherein the bearing race portion is friction welded to the body portion.

3. A propeller blade retention element as claimed in claim 1, wherein the bearing race portion is attached to an external circumferential surface of the body portion.

4. A propeller blade retention element as claimed in claim 1, wherein the bearing race portion comprises two semi-circular parts, wherein a joint or gap is located between the two semi-circular parts.

5. A propeller blade retention element as claimed in claim 1, wherein the bearing race portion comprises an annular element attached to a distal end surface of the body portion.

6. A propeller retention element as claimed in claim 1, further comprising a first bearing race portion provided at a first axial location of the body portion and a second bearing race portion provided at a second axial location of the body portion.

7. A propeller blade comprising:
   a propeller blade retention element as claimed in claim 1; and
   an airfoil section attached to the propeller blade retention element.

8. A propeller blade retention element as claimed in claim 1, wherein the bearing race portion comprises an annular element having an axially extending slot formed therein.

9. A propeller blade retention element of claim 1, wherein the body portion is made from X12CrNiMoV12 stainless steel and the at least one bearing race portion is made from X40CrMoV16-2 stainless steel.

* * * * *